W. S. HARLEY.
VARIABLE SPEED GEARING.
APPLICATION FILED JULY 13, 1912.
1,070,462.
Patented Aug. 19, 1913.
2 SHEETS—SHEET 1.
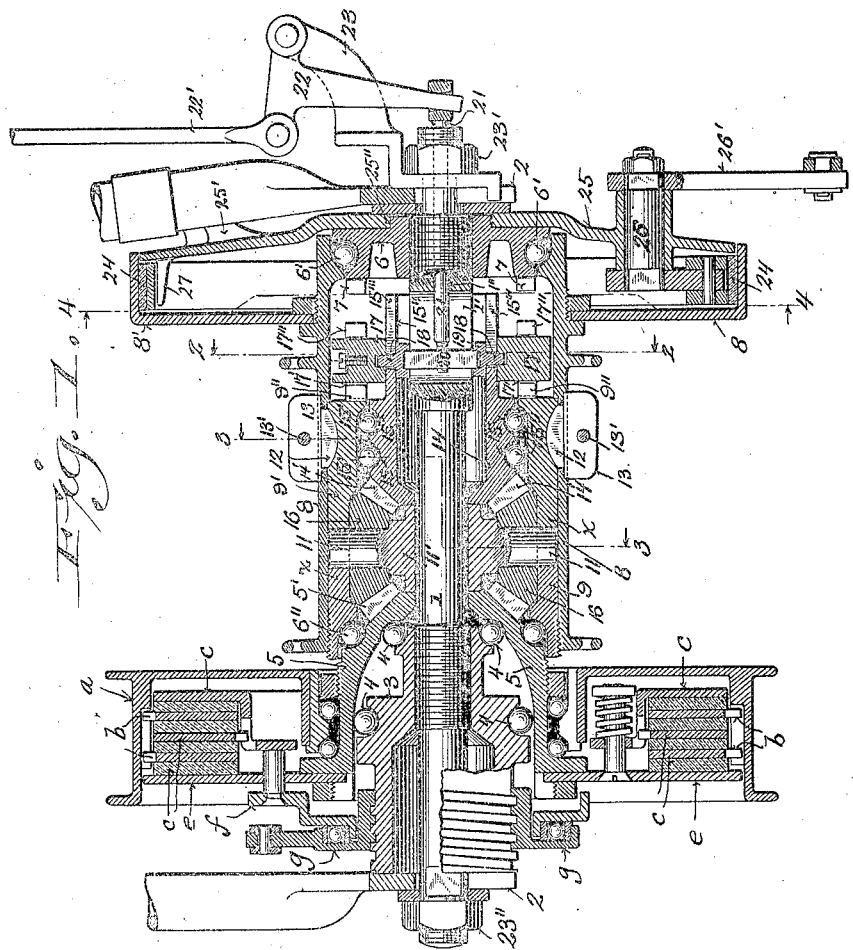

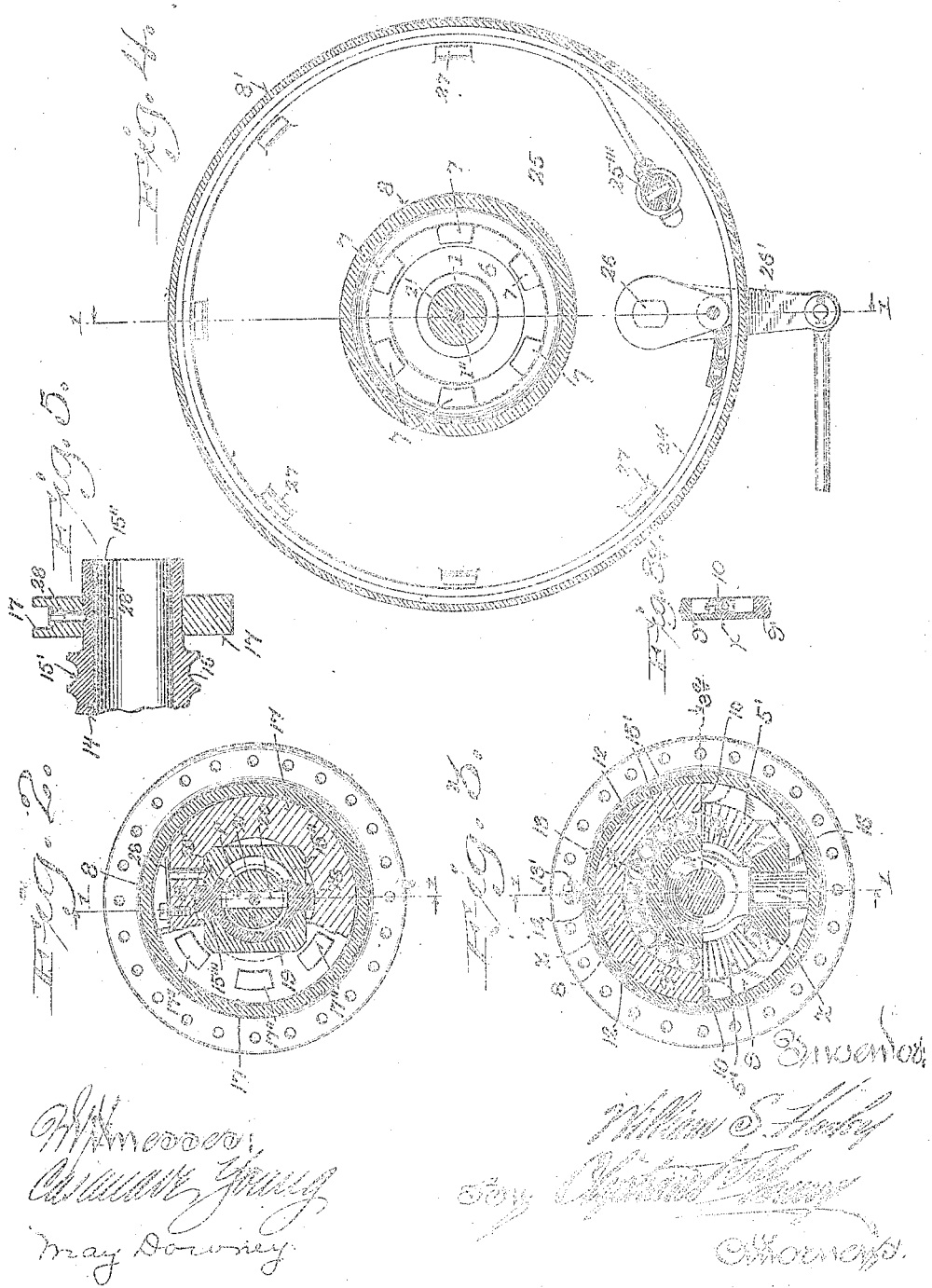

UNITED STATES PATENT OFFICE.

WILLIAM S. HARLEY, OF MILWAUKEE, WISCONSIN.

VARIABLE-SPEED GEARING.

1,070,462.

Specification of Letters Patent.

Patented Aug. 19, 1913.

Application filed July 18, 1912. Serial No. 709,159.

*To all whom it may concern:*

Be it known that I, WILLIAM S. HARLEY, a citizen of the United States, and resident of Milwaukee, in the county of Milwaukee and State of Wisconsin, have invented certain new and useful Improvements in Variable-Speed Gearing; and I do hereby declare that the following is a full, clear, and exact description thereof.
My invention refers to variable speed gearing, its general object being to provide simple, economical and effective gearing of the above mentioned type.

Specific objects of my invention are to provide a pair of sleeves that are rotatory upon a common axis having their inner oppositely disposed ends provided with toothed gears, which gears are meshed with an interposed planetary pinion that is carried by a hub, the same being rotatorily mounted about the sleeves; to provide a coupling member and connections therefor adjacent to the outer end of one of the sleeves whereby the said sleeve is locked in connection with the hub member or freed therefrom and locked against rotation upon its axis; to provide a simple and economical construction whereby the parts are readily assembled; to provide a friction clutch in connection with the drive member, it being understood that the drive member may constitute either the hub or that sleeve which is free to revolve upon its axis at all times, and to provide a manually operated axially disposed plunger in connection with the coupling means whereby the position of the same is shifted to effect changes in the speed of the driven sleeve member or to disengage said driven sleeve member entirely from the drive member.

With the above objects in view the invention consists in certain peculiarities of construction and combination of mechanical elements as hereinafter described with reference to the accompanying illustrations and subsequently claimed.

In the drawings Figure 1 represents a longitudinal sectional view of a variable speed gearing embodying the features of my invention, with parts in full and parts broken away to more clearly illustrate structural features; Fig. 2, a cross-section of the same, the section being indicated by line 2—2 of Fig. 1; Fig. 3, another cross-section, the section being taken upon two planes as indicated by line 3—3 of Fig. 1; Fig. 3ª illustrates a detailed sectional view of a two-part shell that is fitted to a hub; Fig. 4, a detailed cross-sectional view with parts broken away, the section being indicated by line 4—4 of Fig. 1, and Fig. 5, a detailed sectional view of the clutch-ring illustrating a spring-plug means for connecting said clutch-ring adjustably to a neck portion of one of the sleeve members employed in carrying out my invention.

Referring by characters to the drawings, 1 represents a non-rotary axle, which axle is mounted in keeper-plates 2 that constitute part of the rear forks of a motorcycle frame, it being understood that the gearing is shown adapted for use in connection with the wheel hub of a machine of this character. It should be understood however that the device is applicable to any machine wherein variation in speed from a driven member is required. In threaded union with one end of the axle is a spindle 3, which spindle is provided with a pair of races for the reception of two sets of anti-friction balls 4 that serve as bearings for a sleeve 5 which is rotatably mounted thereon, the inner end of the sleeve being provided with beveled gear teeth 5'. The outer end of the sleeve has mounted thereon a loose pulley *a*, which pulley constitutes part of a friction clutch such as shown and described in a patent issued to me March 12, 1912, No. 1020199. This clutch mechanism in a general way comprises sets of anti-friction disks *b* that are carried by the pulley and arranged to be engaged by a second set of disks *c* which are carried by a face-plate *e*, the disks being normally held together under spring tension and are spread by longitudinal movement of a plate *f*, movement of which plate is controlled by a manually operated nut *g* that engages the non-rotatory spindle, it being understood that the face-plate *e* and plate *f* are secured to and rotatable with the sleeve 5. All of the above mentioned construction forms no part of my invention except in combination with the parts to be hereinafter described.

In the accompanying illustrations the sleeve 5 constitutes the drive member and receives its motion from an engine that is in belt connection with the pulley *a*, the engine being not shown. Mounted upon the opposite end of the axle and in threaded connection therewith is a clutch-block 6, which clutch-block is provided with a ball-race for the reception of a series of anti-friction balls 6', the clutch-block being also provided with inwardly extending clutch teeth 7. The rotary sleeve 5 is also formed with a ball-race adjacent to its inner end for the reception of a series of balls 6'', which balls in conjunction with the balls 6' at the opposite end of the axle constitute end bearings for a hub 8. The hub in this instance constitutes the hub of the drive-wheel of a motorcycle and is provided with the usual spoke flanges for the support of the wheel-rim. Tightly fitted into the hub 8 and in threaded union with one end thereof is a shell x, which shell, for convenience in assemblage, is formed in two sections 9, 9', respectively, the sections being fitted together at their inner ends and secured by bolts 10. At the intersection line of the shell sections the same are apertured for the reception of studs 11 that constitute part of a yoke 11', which yoke encircles the axle 1. It is apparent from the foregoing description that the yoke and shell revolve with the hub 8 and constitute parts thereof, the said hub being formed with a ball-race that engages the series of bearing balls 6', while the shell x is provided with a similar ball-race at its opposite end that engages the balls 6''. After the shell member is inserted within the hub proper, it is locked therein by a series of feather-blades 12, which blades are dropped into slots formed in the face of the hub and arranged to fit into radial apertures in the adjacent face of the shell member. Thus these feather-blades firmly key the shell portion of the hub to the hub member proper and after said feather-blades are adjusted in position, they are locked in their seats by a circular band clip 13 which is secured about the outer face of the shell by a bolt 13' that engages the band ends. It is apparent from the foregoing description that the hub can thus readily be stripped from the shell when access is desired to the mechanism for repair or other purposes.

A second intermittently driven sleeve 14 is mounted about the axle and within the shell, said sleeve being provided at its inner end with beveled gear teeth 14'. This sleeve is formed with a pair of ball-races 15 for the reception of anti-friction balls 15' that engage an inner circular wall of the hub shell x, whereby said sleeve 14 is revolubly supported in alinement with the axle 1, about which it is adapted to rotate. The beveled teeth 5' of sleeve 5 and the corresponding beveled teeth 14' of sleeve 14 are engaged by beveled pinions 16, which pinions are loosely mounted upon the yoke trunnions 11 and serve to transmit motion from one of the sleeves to the other. The sleeve 14 is provided with a neck 15'', the outer face of which is rectangular in cross-section. Fitted over this face of the sleeve-neck 15'' is a coupling ring 17, the same being adapted to slide upon said neck and is circularly grooved upon its inner face for the reception of tongues 18. These tongues form part of a collar 19 that is in slidable union with the axle, the said tongues 18 being extended through slots 15''' with which the sleeve neck 15'' is provided, whereby the collar is adapted to play longitudinally but will rotate with the sleeve. The collar 19 is formed with a circular internal groove for the reception of the ends of a key 20, which key is fitted within a transverse slot 1' that is formed in the axle, the said slot being intersected by a longitudinally disposed aperture 1'' that extends therefrom to the end of the axle, the same being bored centrally of said axle. Fitted within the bored aperture 1'' of the axle is a plunger 21 having an inner threaded end that is in threaded union with the key 20, the outer end of the plunger being provided with a slotted head for engagement with the end of one arm of a bell-crank lever 22, whereby the plunger is manipulated. This bell-crank lever is fulcrumed upon an eared bracket 23, which bracket is fitted over the end of the axle in abutting engagement with the adjacent keeper-plate 2 and is secured by a retaining nut 23' that serves to bind the axle and its supporting members together, there being a similar nut 23'' at the opposite end of said axle. The other arm of the bell-crank 22 is connected by a rod 22' to any suitable detent or lever not shown that is located conveniently for manual manipulation by the operator.

The inner face of the coupling ring 17 has projecting therefrom a series of clutch teeth 17', which clutch teeth are arranged to engage corresponding clutch-teeth 9'' that extend from the adjacent end of the shell x. The outer or opposite face of the coupling ring is also provided with a series of clutch-teeth 17'' that are adapted to engage the teeth 7 of the clutch-block 5. Projecting from the plunger-manipulating end of the hub 8 is a clutch housing 8', which clutch housing has nested therein a brake-band 24 of the expansion type. One end of the brake-band is secured to a cap-plate 25 by a retaining bolt 25''' and the opposite end is connected to an arm, which arm is secured to a spindle 26 that projects through the cap-plate and carries a manipulating arm 26', the band being supported at intervals by lugs 27 that extend from said cap-plate. The cap-plate is held against rotation by an ear 25' which is clipped to one of the fork members that constitute part of the frame of the machine. This cap-plate is also provided with a centrally disposed squared aperture 25'' which is engaged by a similar squared hub that projects from the clutch-block 6.

It is apparent from the foregoing description that power from the engine can be connected or disconnected from the sleeve 5 by manipulation of the friction clutch mechanism carried by said sleeve and furthermore that the hub member 8 constituting part of the drive-wheel can be readily controlled by manipulation of the expansible band-brake. The coupling ring 17 being in the position shown it is apparent that the intermittently rotative sleeve 14 will be revolved with the hub member and hence should power be applied to the drive-sleeve 5 motion from said sleeve will be transmitted through its gear connection to the beveled pinions and owing to the fact that the latter are locked against independent rotation both the sleeve and hub will rotate together at the initial high speed imparted to sleeve 5 from the engine. To reduce the speed of the hub member, which in this instance is the driven member, the coupling ring will be manually operated, whereby its clutch-teeth are disengaged from the clutch-teeth carried by the shell which constitutes part of the hub and succeeding such disengagement the teeth 17'' of the clutch ring will be brought into engagement with the clutch-block teeth 7. Hence the intermittently rotative sleeve 14 will be locked against movement and the driving power applied to the drive sleeve 5 will now cause the pinions 16 to rotate upon their trunnions and at the same time they will describe a planetary movement about the axle and owing to the fact that the ratio of the pinions is 1 to 1 with relation to the sleeve teeth 14', which are now held against rotation half speed will be imparted to the hub. Thus a predeterminedly fixed high and low speed can be had by manipulating the plunger which controls the coupling ring 17, it being also understood that the coupling ring assumes an intermediate position with relation to the teeth 9'' of the shell and teeth 7 of the clutch-block, whereby all of the revoluble members are freed and there will be no driving power imparted to the wheel hub. Attention is also called to the fact that by employing a friction clutch mechanism in connection with the driven member that the coupling mechanism can be manipulated so as to produce high or low speed without ability of straining the mechanism, as the sudden jerk incidental to clutching engagement for increased speed will be absorbed by the friction clutch mechanism that is interposed between the engine and drive member.

As best shown in Figs. 2 and 5 the clutch ring 17 is held in its two extreme positions and an intermediate idle position upon the neck 15'' of the sleeve 14 by a spring-controlled plug 28, which plug is carried by the clutch ring and adapted to engage notches 28' that are formed in the outer face of the sleeve neck. Thus the ring is held under slight tension in each of its adjusted positions.

I claim:

1. A variable speed gearing comprising a fixed axle, sleeves loosely mounted about the axle having oppositely disposed toothed inner ends, a fixed clutch member disposed adjacent to the outer end of one of the sleeves, a rotatory hub disposed about said sleeves, a pinion carried by the hub in meshed engagement with the teeth of each sleeve, and a coupling member for selectively connecting one of the sleeves to the hub or fixed clutch member.

2. A variable speed gearing comprising a fixed axle, sleeves loosely mounted about the axle having oppositely disposed toothed inner ends, a clutch-block fast upon said axle adjacent to the outer end of one of the sleeves, a rotatory hub disposed about said sleeves, a pinion carried by the hub in meshed engagement with the teeth of each sleeve, and a slidable coupling member for connecting one of the sleeves to the hub or clutch block.

3. A variable speed gearing comprising a fixed axle, sleeves loosely mounted upon the axle having oppositely disposed toothed inner ends, one of said sleeves being provided with a neck extension, a clutch-block fast upon said axle adjacent to the outer end of the necked sleeve, a rotary hub having one end journaled upon the clutch-block and the opposite end journaled upon the necked sleeve, a bearing for the aforesaid necked sleeve within the hub, a coupling ring slidably supported upon the sleeve neck having means for effecting locking engagement between the hub member and clutch block, a plunger in slidable union with the axle, and means connecting the plunger and coupling ring.

4. A variable speed gearing comprising a fixed axle, a drive sleeve and an intermittently driven sleeve loosely mounted about the axle having oppositely disposed toothed inner ends, a clutch-block fast upon said axle adjacent to the outer end of the intermittently driven sleeve, a rotatory hub disposed about the sleeves, a pinion carried by the hub in meshed engagement with the teeth of each sleeve, a pulley mounted upon the drive sleeve in clutch engagement therewith, and a slidable coupling member having means for connecting the intermittently driven sleeve to the hub or clutch block.

5. A variable speed gearing comprising a fixed axle, a drive sleeve and an intermittently driven sleeve loosely mounted about the axle, the intermittently driven sleeve having a neck extension and each sleeve being provided with oppositely disposed toothed inner ends, a clutch-block secured to said axle adjacent to the outer end of the intermittently driven sleeve, a rotary hub disposed about said sleeves, a shell provided with clutch teeth secured within the hub, bearings for the hub carried by the clutch-block and drive sleeve, a bearing in connection with the hub shell for the intermittently driven sleeve, a yoke disposed about the axle having trunnions in connection with said hub shell, pinions mounted upon the trunnions in meshed engagement with the teeth of each of the sleeves, a coupling ring slidably mounted upon the neck of the intermittently driven sleeve but held against rotation thereon, the ring being provided with clutch teeth extending in opposite directions therefrom for engagement with the shell clutch teeth and clutch block, a plunger reciprocatively mounted within the axle, and coupling ring engaging means carried by the plunger.

6. A variable speed gearing comprising a fixed axle provided with an elongated slot extending transversely thereof and a centrally bored aperture that communicates with the slot, a sleeve having an exteriorly threaded shank rigidly secured to the axle adjacent to one end, a rotatory drive sleeve mounted upon said threaded sleeve, a clutch-block rigidly secured to the opposite end of the axle, a hub journaled upon the clutch-block and drive sleeve, an intermittently driven sleeve provided with a slotted neck extension revolubly mounted within the hub, a toothed gear-wheel carried at the inner end of the drive-sleeve and a toothed gear-wheel carried at the inner end of the intermittently driven sleeve, beveled pinions carried by the hub in meshed engagement with the sleeve gears, a collar slidably mounted upon the axle having tongues that project through the neck slots of the intermittently driven sleeve, a coupling ring in slidable union with the neck of the sleeve and engaged by the collar tongues, the coupling ring having means for effecting locking engagement with the hub or the clutch-block, a key fitted through the axle-slot in engagement with the slidable collar, a plunger fitted within the axle aperture in connection with the key, and means for manually actuating the plunger.

In testimony that I claim the foregoing I have hereunto set my hand at Milwaukee in the county of Milwaukee and State of Wisconsin in the presence of two witnesses.

WILLIAM S. HARLEY.

Witnesses:
   E. J. MUELLER,
   ARTHUR DAVIDSON.